United States Patent
Adhikari et al.

(10) Patent No.: US 12,265,588 B1
(45) Date of Patent: Apr. 1, 2025

(54) SYSTEM AND METHOD FOR TOPIC-BASED SEARCH ENGINE

(71) Applicant: AMERICAN EXPRESS TRAVEL RELATED SERVICES COMPANY, INC., New York, NY (US)

(72) Inventors: Purushottam Adhikari, Burgess Hill (GB); Yousef Simmons, Burgess Hill (GB); Robert Shafik, Brighton (GB)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 18/516,216

(22) Filed: Nov. 21, 2023

(51) Int. Cl.
*G06F 16/9538* (2019.01)
*G06F 16/906* (2019.01)

(52) U.S. Cl.
CPC ........ *G06F 16/9538* (2019.01); *G06F 16/906* (2019.01)

(58) Field of Classification Search
CPC ............................ G06F 16/9538; G06F 16/906
See application file for complete search history.

(56) References Cited

U.S. PATENT DOCUMENTS 7,873,622 B1 * 1/2011 Karls ..................... H10N 50/10
707/707

* cited by examiner

*Primary Examiner* — Baoquoc N To
(74) *Attorney, Agent, or Firm* — Sterne, Kessler, Goldstein & Fox, P.L.L.C.

(57) ABSTRACT

Disclosed herein are system, method, and computer program product embodiments for providing search results to an agent that are organized and streamlined to allow for quick and efficient navigation by the agent. The database responds to a search query with a plurality of search results. Certain configurations allow these data entries to include tags included within their metadata that identify a type associated with those entries. The entries are then categorized based on their respective types. Once categorized, the categories are then analyzed for relevance to determine which of the categories should be displayed. Once this has been determined, then each of the different panes are sized and positioned based on their respective relevancy. Further, entries within the different panes can be emphasized based on their relevance to provide the agent with a short list of highest relevance entries for review.

20 Claims, 6 Drawing Sheets

SYSTEM AND METHOD FOR TOPIC-BASED SEARCH ENGINE

BACKGROUND

Field

This field is generally related to searching one or more databases, and more specifically to visually optimizing search results in an agent environment.

Background

A customer care profession (e.g., an agent) that works with customers is often required to answer a multitude of different customer questions, as well as address numerous different customer requests. This requires the ability to quickly and correctly identify relevant information in large databases of information.

BRIEF SUMMARY

Disclosed herein are system, apparatus, device, method and/or computer program product embodiments, and/or combinations and sub-combinations thereof, for optimizing search result presentation.

A customer care profession (e.g., an agent) that works with customers is often required to answer a multitude of different customer questions, as well as address numerous different customer requests. This requires the ability to quickly and correctly identify relevant information in large databases of information. Unfortunately, current technology operates similar to basic search engines. Specifically, when a user enters a search query, the results of the query are returned in a long list without any differentiation. As a result, the user is required to manually sift through the search results to find the more relevant response to the search. This can be very time consuming, which is extremely undesired while dealing with customers. Additionally, an agent's rush to find an answer will often lead to obtaining incorrect or partial information, which will only further the customer's frustration with the situation and the company.

The present application provides solutions to this problem. According to the present application, search results are categorized by the search engine and organized into their different categories for display on a graphical user interface to the user. Therefore, an agent that knows that they are looking for a particular type of result, such as a directory or a product/service being offered, can immediately look to the subset of results categorized as such to significantly limit the number of search results that need to be analyzed.

Additionally, the present application describes additional enhancements to even further assist an agent with their search. For example, the panes that display the different categories of results can be sized and positioned in the graphical user interface according to their calculated relevance. Additionally, the results can be ordered according to most relevant or most-accessed results. For example, top results in each category may be emphasized in some fashion. In some embodiments, machine learning can be used to assist with these determinations.

In this manner, search results are not presented to the user as a simple list, but rather categorized and organized according to their relevance and usefulness. These and other advantages will be apparent from the following detailed description.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Disclosed herein are system, apparatus, device, method and/or computer program product embodiments, and/or combinations and sub-combinations thereof, for optimizing search result presentation.

A customer care professional (e.g., an agent) that works with customers is often required to answer a multitude of different customer questions, as well as address numerous different customer requests. This requires the ability to quickly and correctly identify relevant information in large databases of information. Unfortunately, current technology operates similarly to basic search engines. Specifically, when a user enters a search query, the results of the query may be returned in a long list without any differentiation that is relevant to the user. As a result, the user is required to manually sift through the search results to find the most relevant response to the search. This can be very time consuming, which is extremely undesired while dealing with customers. Additionally, an agent's rush to find an answer will often lead to obtaining incorrect or partial information, which will only further the customer's frustration with the situation and the company.

The present application provides solutions to this problem. According to the present application, search results are categorized by the search engine and organized into their different categories for display on a graphical user interface to the user. Therefore, an agent that knows that they are looking for a particular type of result, such as a directory or a product/service being offered, can immediately look to the subset of results categorized as such to significantly limit the number of search results that need to be analyzed.

Additionally, the present application describes additional enhancements to even further assist an agent with their search. For example, the panes that display the different categories of results can be sized and positioned in the graphical user interface according to their calculated relevance. Additionally, the results can be ordered according to most relevant or most-accessed results. For example, top results in each category may be emphasized in some fashion. In some embodiments, machine learning can be used to assist with these determinations.

In this manner, search results are not presented to the user as a simple list, but rather categorized and organized according to their relevance and usefulness. These and other advantages will be apparent from the following detailed description.

Figure 1:
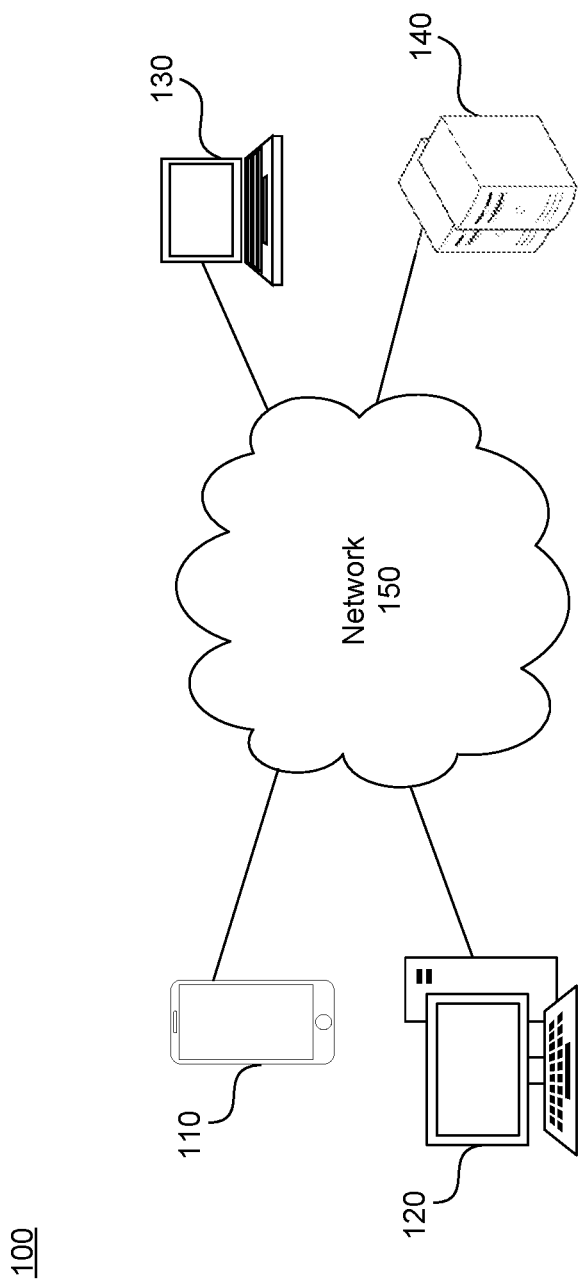
FIG. 1 illustrates a block diagram of an assistance environment, according to some embodiments.

FIG. 1 illustrates a block diagram of an assistance environment 100, according to some embodiments. As shown in FIG. 1, the environment 100 includes a user device 110 and/or a user terminal 120 connected to an agent terminal 130 and one or more servers 140 via a network 150.

In an embodiment, the user device 110 may include a cellular telephone, a personal digital assistant, a personal computer, or other computing device capable of making a call, or communicating over the network 150 with agent terminal 130. In an embodiment, the user device 110 communicates using any known digital communication standard via one or more cellular telephone networks, such as 5G, 4G, etc.

In an embodiment, user terminal 120 includes a personal computer, laptop computer, or any other device capable of accessing the one or more servers 140 and/or the agent terminal 130 via the network 150. In an embodiment, the user terminal 120 communicates via the Internet using any known digital communication protocol, including but not limited to known packet-based protocols, such as hypertext transfer protocol (HTTP).

In an embodiment, the agent terminal 130 is located at, or is associated with, the servicing website's owner/operator company. In embodiments, the agent terminal 130 is used by an agent of the company used for purposes of assisting the needs of customers.

In an embodiment, the servers 140 are a corporation's web servers configured to generate and display an interface to the agent and to interact with company data servers in support therefor. The servers 140 may be any suitable type of server capable of retrieving necessary data and generating the agent or user interfaces.

In operation, a user may call a customer service number, enter into an online customer service chat, or access the company's website in an attempt to resolve or obtain assistance with some issue. The user may carry out these operations using either the user device 110 or the user terminal 120. In the event that the user engages an agent, the user will be connected via the network 150 to an agent operating at agent terminal 130.

When the user contacts the company through its agent, the user interacts with the agent in order to have the user's questions, comments, requests, or other needs addressed. In order to address the user's needs, the agent may use the agent terminal 130 to conduct database searches of the one or more databases in order to locate an answer or solution to the user's needs. In response to a search query, the servers 140 will generate a results interface that selects and/or organizes the information in a manner that is most relevant to the agent, and which can be quickly and easily digested by the agent, as will be described in further detail below. This reduces the response time to the user, and significantly improves customer relations. These and other aspects will be described in further detail below.

Figure 2:
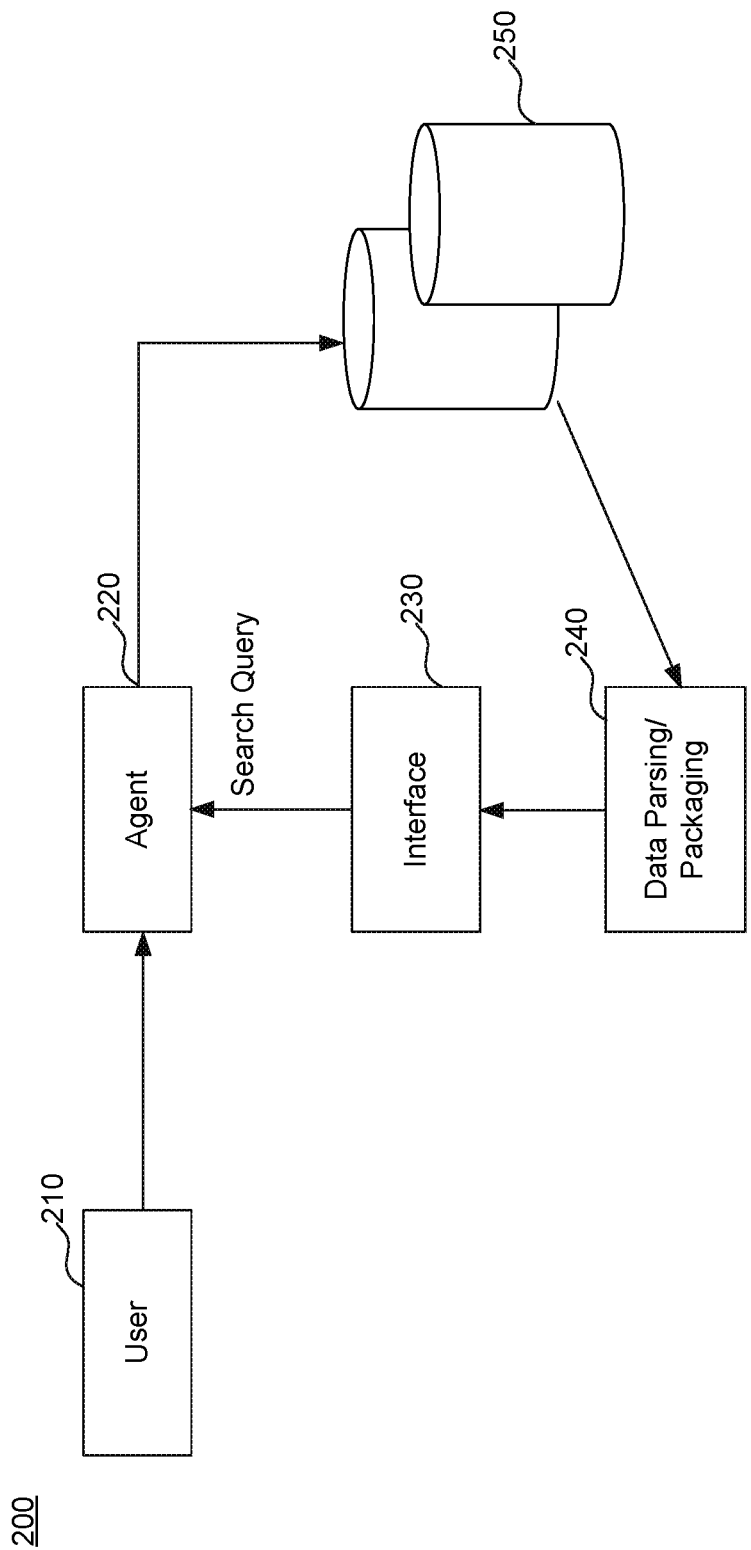
FIG. 2 illustrates a block diagram of a searching environment, according to some embodiments.

FIG. 2 illustrates a block diagram of a searching environment 200, according to some embodiments. As shown in FIG. 2, the environment 200 includes a user 210, an agent 220, an interface 230, the backend servers 250, and the data parsing/packing 240. In an embodiment, the user 210 communicates with the agent 220 for service assistance. As discussed above, the user may be communicating with the agent via either a user device 110 or a user terminal 120.

In an embodiment, the agent 220 receives a request for help from the user. There may be a variety of different requests made by any particular user, including but not limited to requesting information about a bill, requesting certain available products or services, information regarding promotions or sales, a change to a user's plan, request for a new card, fraud alert, etc. In many cases, the agent 220 may not know the appropriate response from memory, and may not have immediate access to the proper response protocols.

Therefore, the agent 220 generates a search query at the user terminal to search the servers 250 for the appropriate responses. In embodiments, the search query follows traditional plain language querying, where the user merely enters a series of search terms or a search phrase into a search field. This search query is sent from the agent terminal 220 to the servers 250. The servers 250 carry out the search, which can produce a substantial number of results with varying degrees of relevance. Additionally, the results can include a variety of different types. For example, there may be relevant results in products or services, in a directory of contacts, in promotions, news, etc. All these results are returned from the servers 250 to the data parsing/packing 240.

The data parsing/packaging 240 is responsible for organizing the received results for providing them to the user. Specifically, each result received from the servers 250 may include metadata or tags that identify its type. The data parsing/packing 240 identifies these different types from the metadata and categorizes the received results accordingly. The different groups of results are then provided to the interface 230.

The interface 230 is responsible for generating the user interface for providing the results of the search to the user. As discussed above, the interface 230 performs a variety of operations on the received groups of data in order to organize and/or emphasize the different datasets for display to the user. In some embodiments, this may include organizing the different groups of results into different panes, sizing the different panes according to relevance, organizing the results within each pane according to likely usefulness, rearranging the different panes according to relevance, etc., as will be discussed in further detail below.

Once the interface 230 generates the appropriate user interface, the interface 230 forwards the user interface to the agent 220 at the agent terminal. From this interface, the agent 220 may review and quickly assess the most appropriate of the received responses. In an embodiment, the user interface includes links to each of the different responses that can be selected by the agent 220, and which will take the agent to a webpage, document, contact registry, news article, instruction document, or other information corresponding with the search result. The responses may also include documentation generated for use internally to an organization. For example, this documentation may include documents and/or pages used to assist customer service agents. This documentation may not be publicly accessible via the Internet. Rather, the documentation may be stored on an intranet. The intranet may be accessible by the customer service agents. Retrieved search results may include this internal documentation and/or publicly accessible documents or pages.

Data parsing/packaging 240 and/or interface 230 may be services and/or applications implemented on one or more servers. For example, data parsing/packaging 240 and/or interface 230 may be services implemented on servers 250. An agent 220 may access server 250 using a user terminal to provide a query. Server 250 may then perform the searching operations as well as the graphical user interface generation operations. For example, server 250 may execute the data parsing/packaging 240 and/or interface 230 services to generate one or more graphical user interfaces that organize the display of the search results as described herein. Server 250 may then provide the generated graphical user interfaces to the user terminal used by agent 220 for display.

Figure 3:
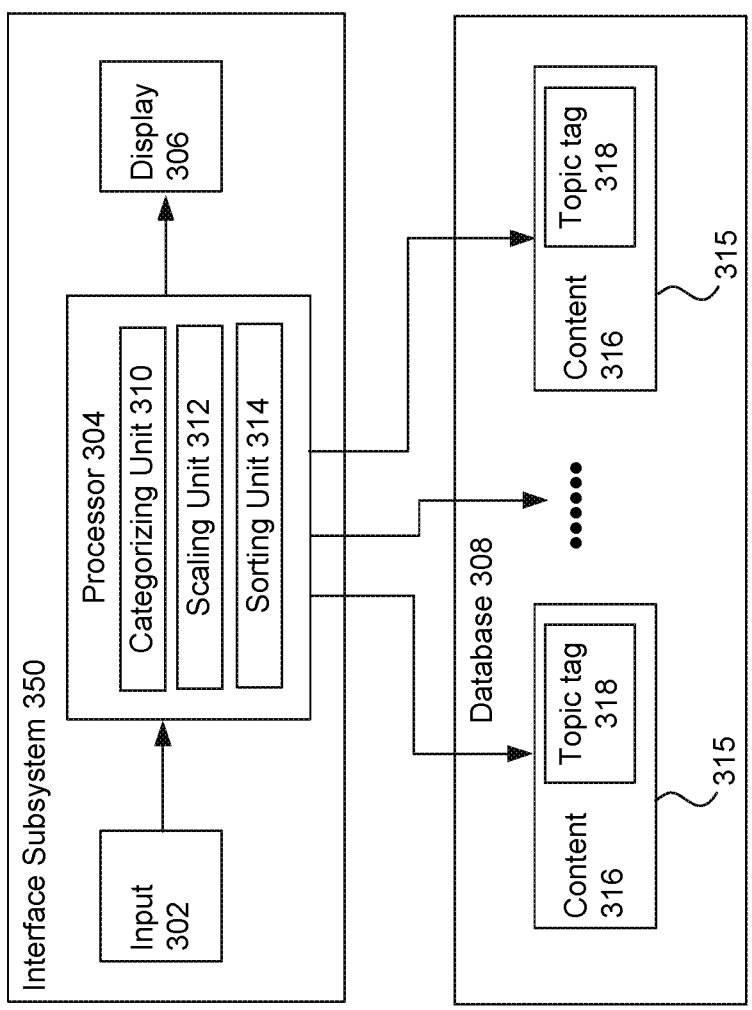
FIG. 3 illustrates a block diagram of an exemplary searching system, according to some embodiments.

FIG. 3 illustrates a block diagram of an exemplary searching system 300, according to some embodiments. As shown in FIG. 3, the searching system 300 includes an interface subsystem 350 and a database 308. The searching system 300 includes an input 302 connected to a processor 304, which produces output at the display 306. As shown in FIG. 3, the processor 304 includes a categorizing unit 310, a scaling unit 312, and a sorting unit 314.

Additionally, the database 308 stores a plurality of different data entries 315, that each include content 316 and a topic tag 318. As discussed above, in embodiments, the topic tag 318 is included within metadata of the entry.

In operation, the searching system 300 receives a search query from a user via the input 302. In an embodiment, the input 302 may receive the query via a communication channel, such as via a wired or wireless communication interface. Input 302 may be a communication interface configured to communicate with a user terminal used by a customer service agent. Upon receipt of the search query, the input 302 forwards the query to the processor 304. The processor 304 executes the search query at the database 308. In an embodiment, this may include forwarding, repackaging, or otherwise translating the query into a readable instruction by the database 308. The processor 304 then forwards the query to the database 308.

The database 308 receives the query from the processor 304 and searches its stores for relevant results and/or data entries 315. In an embodiment, as shown in FIG. 3, each entry 315 stored in the database includes content 316 and a topic tag 318. The topic tag 318 may be included within metadata of the entry 315, and may identify a type associated with the entry 315. For example, different data entries may be one of varying types, including but not limited to offers & promotions, products & services, news, etc. In some cases, certain entries may not have an associated type. As described herein, the data entries 315 may also include documentation generated for use internally to an organization. For example, this documentation may include documents and/or pages used to assist customer service agents. This documentation may not be publicly accessible via the Internet. Rather, the documentation may be stored on an intranet. The intranet may be accessible by the customer service agents. Search results retrieved from database 308 may include this internal documentation.

The database 308 returns the relevant results to the interface subsystem 350, which are received at processor 304. Based on the metadata of the different entries returned from the search, the processor 304 performs a number of different operations on the received data in order to present that data to the agent. For example, a categorizing unit 310 of the processor 304 categorizes the different data entries into different categories or groups of data based on their respective metadata. This may include, for example, grouping products and services together, offers and promotions together, directory entries together, and other entries, such as news together. In some instances, the categorizing unit 310 may be further configured to categorize returned data entries that did not include an associated topic tag 318. In embodiments, this can be performed using machine learning, artificial intelligence (AI), or another method capable of reviewing the content of the data entry and making a determination as to its likely type. The categorizations of the different data entries 315 may be used to effectively determine a pane within the responsive display or graphical user interface. This may visually categorize the data entries 315 for viewing by the agent.

The scaling unit 312 then determines, which of the panes to display to the agent, as well as a size and/or orientation of the respective panes. In particular, the scaling unit 312 determines which of the different groups of results to display to the user. There may be a variety of different methods for making this determination, including displaying all panes, displaying a predetermined number of panes having the most results, and/or displaying a predetermined number of panes considered to be the most relevant to the agent's search query. Once again, the relevance determination may be performed using machine learning or artificial intelligence based on previous selections from similar searches.

Once the scaling unit 312 determines which panes to display to the agent, the scaling unit 312 may then determine their respective sizes. In particular, there is a limited amount of display space with which to provide the agent with results information. Nonetheless, the display 306 may be capable of generating a graphical user interface displaying several results. Therefore, in order to draw the agent's attention to those panes of emphasis or relevance, the scaling unit 312 can size and orient the panes according to different factors. In an embodiment, a pane determined to have a larger number of hits, or having the greater relevance to the agent's search query can be displayed with a larger size. Similarly, a pane with a smaller number of hits from among those displayed or with less relevance from among those displayed, may be displayed with a smaller size. Similarly, the scaling unit 312 can position the more relevant and/or larger panes on the top left of the display interface, whereas less important and/or smaller panes are designated toward the right/bottom of the display interface. In this manner, the agent's attention is drawn to the search results deemed most relevant to the agent's request.

Additionally, a sorting unit 314 is configured to arrange the results within each pane. In an embodiment, the sorting unit 314 arranges the results according to their estimated relevance to the user. In embodiments, this relevance determination can be performed using AI or machine learning in order to determine, based on the user's query, the results that are most likely to be useful to the user. In other embodiments, the sorting unit 314 can arrange the results according to other factors, such as most popular (e.g., most used), most highly rated (if such a rating system is employed), or other factors. Based on this analysis, the sorting unit 314 identifies a number of entries within each pane to be moved to the top of the pane for emphasis to the agent. Additionally, the sorting unit 314 may further arrange the remaining results within each pane according to their estimated relevance.

The processor 304 then generates a user interface based on the results of the categorizing unit 310, scaling unit 312, and sorting unit 314. As a result, the most relevant categories of search results are organized into different panes, with the most relevant of those results being positioned near the top of those panes and/or emphasized within those panes. Additionally, the panes are arranged such that a most relevant category is located at a high-priority position within the interface (e.g., the top left), whereas less relevant panes are located in lower-priority positions (e.g., nearer the bottom right). This interface information is then sent to the display 306, which outputs the graphical user interface to the agent's terminal.

Figure 4:
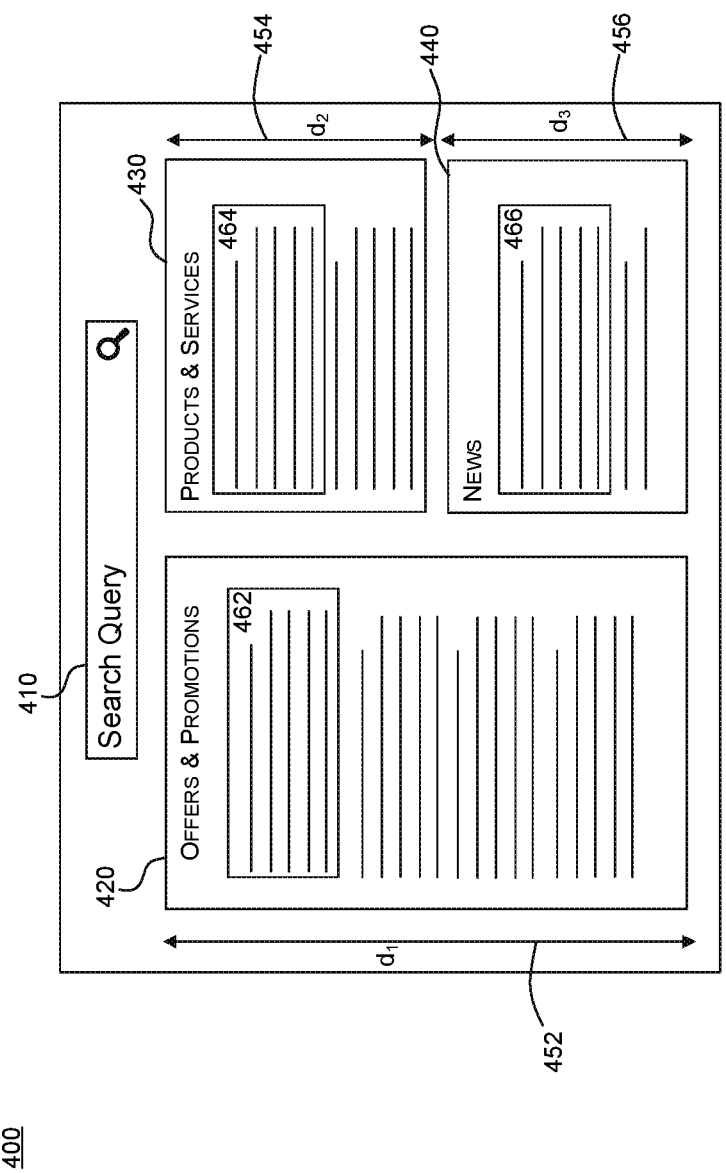
FIG. 4 illustrates an exemplary user interface generated by the searching system, according to some embodiments.

FIG. 4 illustrates an exemplary user interface 400 generated by the searching system, according to some embodiments. As shown in FIG. 4, the user interface 400 includes a search query field 410, within which the agent is able to enter the request search string, or to enter new or additional search strings in order to refine their search or conduct a new or updated search. The user interface also includes a plurality of different panes 420, 430, and 440 corresponding to different categories of search results.

In the example of FIG. 4, pane 420 displays the offers & promotions category of results. Because this pane is located at the top left of the interface, it has been deemed to be most relevant to the agent's search query. This may be the case, for example, when the agent searches for "airline deals" or "travel discounts," etc. The pane 420 is displayed with a size $d_1$ 452, which may be used either to depict the amount of results within that category or to depict its relevance. Additionally, within the pane 420, a certain subset of results may be emphasized, such as by noting them within an emphasis window 462, or through other means, such as by highlighting, bolding, using different fonts, etc.

The other panes are similarly configured. For example, pane 430 includes results corresponding to products & services, which was deemed to be second-most relevant. The pane is given a height $d_2$ 454 corresponding to its relevance or its number of results, and includes a section of emphasis 464 within which the most relevant results within that category are emphasized to the agent.

Similarly, another pane 440 includes results relating to news, and has a height $d_3$ 456 based on its relevance or the number of results included within its category. Pane 440 also includes a section of emphasis 466, within which the most relevant results within that category are emphasized to the agent.

Although in this example, the "Offers & Promotions" category was deemed most relevant, other search queries may cause these panes to be reordered and/or resized according to their respective relevancies to that query. Additionally, panes illustrated in FIG. 4 may be absent from future interfaces and replaced with different categories that are not currently shown based on those categories' relevancies to the user's search query.

Figure 5:
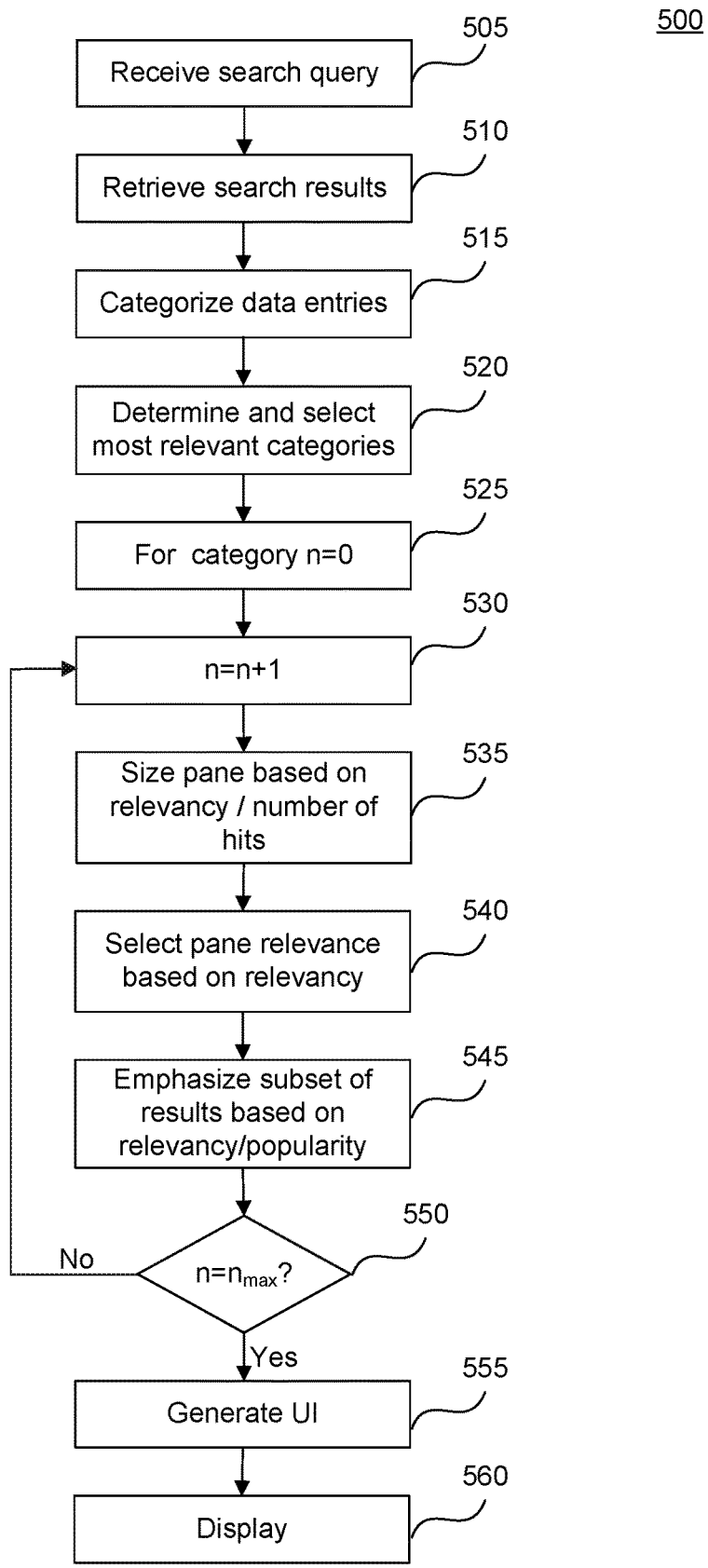
FIG. 5 illustrates a flowchart diagram of an exemplary method for optimizing search result presentation according to some embodiments.

FIG. 5 illustrates a flowchart diagram of an exemplary method 500 for optimizing search result presentation according to embodiments of the present disclosure. The method 500 begins with receiving a search query at step 505. For example, a server may receive the search query from an agent terminal. In an embodiment, the search query is generated by an agent and transmitted from an agent terminal to a server and/or database either directly, or through an intermediary over a communication interface. In embodiments, the search query includes natural language querying and/or uses a Boolean structure to provide one or more search terms to a search engine.

In step 510, the results of the search request are retrieved. In embodiments, the results include a list of data entries deemed relevant to the search request. In an embodiment, the data entries each include content, such as a document, webpage, directory listing, article, etc., as well as metadata that includes one or more tags indicating a type or category associated with the entry. The data entries may also include documentation generated for use internally to an organization. For example, this documentation may include documents and/or pages used to assist customer service agents. This documentation may not be publicly accessible via the Internet. Rather, the documentation may be stored on an intranet. The intranet may be accessible by the customer service agents. Retrieved search results may include this internal documentation and/or publicly accessible data entries.

In step 515, the search results are categorized into different categories or groups of data based on their respective metadata. As previously explained, the search results may include a plurality of data entries. In step 515, the data entries may be categorized into one of a plurality of different categories. This may include, for example, grouping products and services together, offers and promotions together, directory entries together, and other entries, such as news together. In different embodiments, the search results may be categorized in advance, and their respective categories included within the search result metadata. In other embodiments, returned data entries that do not include an associated topic tag are categorized based on their metadata. In embodiments, this can be performed using machine learning, artificial intelligence (AI), or another method capable of reviewing the content of the data entry and making a determination as to its likely type. The categorizations of the different data entries may be used to effectively determine a pane within the responsive display or graphical user interface.

In step 520, a determination is made regarding which of the different categories are the most relevant to the agent based on the agent's search query. In some embodiments, this determination further includes determining the number of search results within each category. In an embodiment, this can be performed by tabulating the number of results tagged within each category, by determining those above a predetermined level of relevancy within each category, or other methods. In an embodiment, a subset of the total number of categories is selected for display in this step, which can include the top x most relevant categories. In an embodiment, x can be a preset number (e.g., 3), or can be determined based on the number of categories exceeding some threshold of relevance. The categories determined to be most relevant are then selected for display and inclusion in a user interface. Step 520 may also include selecting a subset of the different categories for inclusion in the user interface.

In step 525, once top categories have been identified, the method 500 organizes, sizes, and configures the panes corresponding to those different categories in an interface to be displayed. In particular, the method 500 sets a starting value of n to 0 in step 525 in order to initialize the configuring of the interface. In step 530, n is incremented by 1 in order to represent the first category/pane of the interface. For the selected pane, the method 500 then performs a series of steps in order to position and configure the pane for display.

In step 535, a size of the pane is determined based on its relevancy and/or number of hits included within its corresponding category. For example, in an embodiment, the pane is sized proportionally to its relevance, meaning that a category determined to most likely include information desired by the agent based on the search query will be sized larger within the displayed interface. In another embodiment, the pane can be sized according to the proportion of the number of hits within that category. For example, for a search that returns 1000 results, a pane that includes 600 of those results will be sized proportionally larger than the other relevant categories being displayed.

In step 540, a position of the pane within the interface is determined. In embodiments, this position is determined based on the relevancy of the category (e.g., the likelihood that information included within the category will satisfy the agent's search request). In an embodiment, positions within the interface are prioritized according to their viewing likelihood. In western cultures, this makes a top left position within the interface top priority, whereas positions nearer to the bottom and/or right have lower priority. Based on this, and the determined relevancy of the pane, the method 500 selects a position for the pane within the interface.

In step 545, the contents of the pane are analyzed in order to determine a subset of the results within that pane that should be emphasized to the agent. In embodiments, these will be a most relevant or most popular subset of the results, or a combination thereof. In an embodiment, the number of results to be emphasized may be set in advance, such as top 3, or top 5. In other embodiments, the results to be emphasized may be determined based on a comparison to one or more thresholds, such as those that exceed a relevancy threshold and/or those that exceed a popularity threshold.

In step 550, a determination is made as to whether n (e.g., the current pane) is equal to $n_{max}$ (e.g., the last of the panes to be displayed). In embodiments, $n_{max}$ is equal to the determined number of relevant categories to display in step 520. If not (550—No), then the method 500 proceeds to step 530, where n is incremented and steps 535-550 are repeated for the next pane. If, on the other hand, this is the last pane (550—Yes), then the method 500 proceeds to step 555.

In step 555, the user interface is generated based on the determinations made in steps 535-550 for the various panes. For example, in this step, each of the panes to be displayed is sized within the available space of the user interface, and positioned in their respective positioned within the interface. The subset of results within each pane are also emphasized. In different embodiments, these results may be emphasized through a notation, such as highlighting or bolding, or can be emphasized by separating these results from the others, such as for example boxing them.

Once the user interface has been generated in step 555, the user interface is output and displayed to the agent in step 560. This may include transmitting graphical user interface data to a device or terminal used by the agent. The device or terminal may then use the received data to display the user interface.

It should be understood that unless a method step relies on an earlier method step for completion, the order of the various method steps may be rearranged according to different embodiments and implementations. Additionally, there may be many modifications available for the method of FIG. 5. For example, the method may include more or fewer steps than those described above depending on specific implementation.

Figure 6:
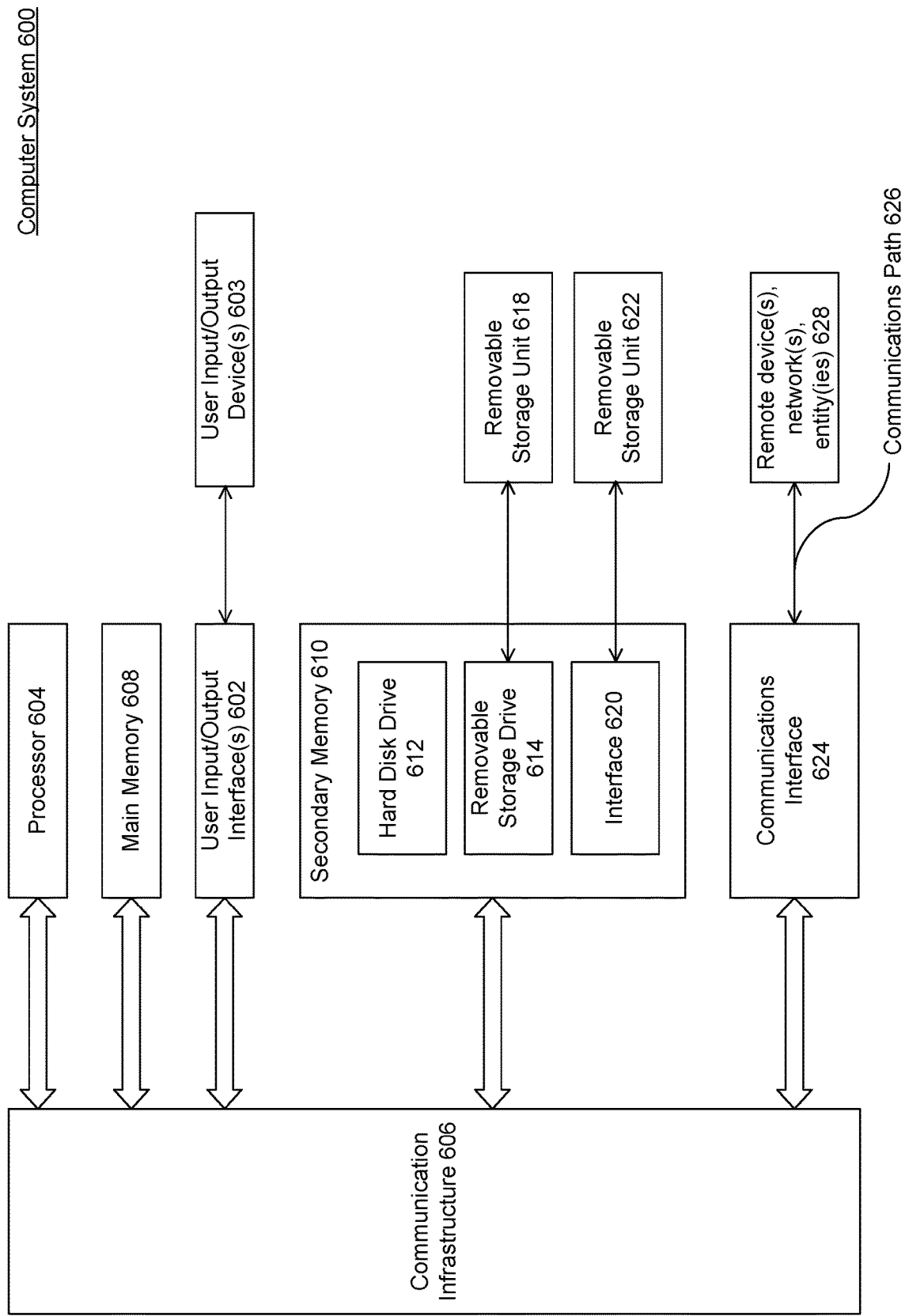
FIG. 6 illustrates a block diagram of an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for topic-based dynamic display of a search engine results page, the method comprising:
receiving search results of a search query, the search results including a plurality of data entries responsive to the search query;
categorizing each of the received plurality of data entries into one of a plurality of different categories;
first determining a relevancy of each of the plurality of different categories;
selecting a subset of the plurality of different categories for inclusion in a user interface based on the first determining;
for each category included within the subset of the plurality of different categories, generating corresponding panes by:
calculating a size of a pane associated with a category to be displayed within the user interface;
second determining a position of the pane within the user interface; and
identifying a subset of data entries among data entries included within the category to be emphasized within the pane; and
generating the user interface that includes the panes associated with each of the categories included within the subset of the plurality of different categories, each pane including the corresponding size, position, and emphasized subset of data entries.

2. The method of claim 1, wherein each of the plurality of data entries includes content and a topic tag that identifies a type associated with a data entry.

3. The method of claim 2, wherein the categorizing is based on the topic tag of the plurality of data entries.

4. The method of claim 1, wherein the plurality of different categories include at least one of promotions, news, products, processes, references, and directories.

5. The method of claim 1, wherein the size of the pane is calculated based on a relevance of the category associated with the pane relative to relevancies of other categories being displayed in the user interface.

6. The method of claim 1, wherein the position of the pane within the user interface is based on a relevance of the category associated with the pane relative to relevancies of other categories being displayed in the user interface.

7. The method of claim 1, wherein the emphasized subset of data entries are at least one of highlighted, positioned at a top of the pane, or boxed.

8. A system for topic-based dynamic display of search results, comprising:
- a memory that stores the search results; and
- one or more processors configured to:
  - receive the search results of a search query, the search results including a plurality of data entries responsive to the search query;
  - categorize each of the received plurality of data entries into one of a plurality of different categories;
  - first determine a relevancy of each of the plurality of different categories;
  - select a subset of the plurality of different categories for inclusion in a user interface based on the first determining;
  - for each category included within the subset of the plurality of different categories, generate corresponding panes by:
    - calculate a size of a pane associated with a category to be displayed within the user interface;
    - second determine a position of the pane within the user interface; and
    - identify a subset of data entries among data entries among data entries included within the category to be emphasized within the pane; and
  - generate the user interface that includes the panes associated with each of the categories included within the subset of the plurality of different categories, each pane including the corresponding size, position, and emphasized subset of data entries.

9. The system of claim 8, wherein each of the plurality of data entries includes content and a topic tag that identifies a type associated with a data entry.

10. The system of claim 9, wherein the categorizing is based on the topic tag of the plurality of data entries.

11. The system of claim 8, wherein the plurality of different categories include at least one of promotions, news, products, processes, references and directories.

12. The system of claim 8, wherein the size of the pane is calculated based on a relevance of the category associated with the pane relative to relevancies of other categories being displayed in the user interface.

13. The system of claim 8, wherein the position of the pane within the user interface is based on a relevance of the category associated with the pane relative to relevancies of other categories being displayed in the user interface.

14. The system of claim 8, wherein the emphasized subset of data entries are at least one of highlighted, positioned at a top of the pane, or boxed.

15. A non-transitory computer-readable storage medium storing instructions thereon that when executed by one or more processors cause the one or more processors to execute functions, comprising:
- receiving search results from one or more databases in response to a search query submitted by a user, the search results including a plurality of data entries;
- classifying each of the plurality of data entries into one of a plurality of different categories based on at least one of metadata or content of the plurality of data entries;
- selecting a subset of categories from among the plurality of different categories for display in a user interface based on at least one of relevance of the subset of categories to the search query and a number of data entries classified in the subset of categories;
- for each category included within the subset of categories, determining a size and position of a pane to be displayed within the user interface based on a relative relevance of a category to other categories included within the subset of categories; and
- generating the user interface, wherein the user interface includes a plurality of panes, each pane corresponding to each category included within the subset of categories.

16. The non-transitory computer-readable storage medium of claim 15, wherein the pane is a visual grouping of data entries included within a single category from among the subset of categories.

17. The non-transitory computer-readable storage medium of claim 15, wherein the plurality of panes are positioned within the user interface with most relevant positioned nearer to a top left of the user interface and less relevant positioned nearer to a bottom right of the user interface.

18. The non-transitory computer-readable storage medium of claim 15, wherein the plurality of panes are sized within the user interface with most relevant having a larger size.

19. The non-transitory computer-readable storage medium of claim 15, wherein the functions further comprise:
- selecting a subset of data entries within each pane of the plurality of panes for emphasis; and
- emphasizing the subset of data entries within each pane by highlighting, separating, or boxing the subset of data entries.

20. The non-transitory computer-readable storage medium of claim 19, wherein data entries within each pane having a highest relevancy are selected for inclusion in the subset of data entries.

* * * * *